Dec. 14, 1965 W. J. SENSING ETAL 3,223,909
ELECTRIC MOTOR CONTROL SYSTEM
Filed Jan. 26, 1962 2 Sheets-Sheet 1

INVENTORS
William J. Sensing
Donald E. Colvill
Brooks H. Short
David S. Dennis
BY C. R. Meland
THEIR ATTORNEY INVENTORS
William J. Sensing
Donald E. Colvill
Brooks H. Short
David S. Dennis BY C. R. Meland United States Patent Office 3,223,909
Patented Dec. 14, 1965

3,223,909
ELECTRIC MOTOR CONTROL SYSTEM
William J. Sensing, Donald E. Colvill, and Brooks H. Short, Anderson, and David S. Dennis, Chesterfield, Ind., assignors to General Motors Corporation, Detroit, Mich., a corporation of Delaware
Filed Jan. 26, 1962, Ser. No. 168,964
4 Claims. (Cl. 318—139)

This invention relates to electric motor control systems and more particularly to a system that provides substantially infinite speed control of an electric motor.

One of the objects of this invention is to provide a speed control system for an electric motor wherein a square wave generator controls a device such as a transistor which in turn controls the amount of current supplied to the motor. In this system, the square wave generator includes a means for varying the width of the output pulses over a wide range to therefore achieve substantially infinite speed variation of the motor.

Another object of this invention is to provide a motor control system for a motor vehicle such as a fork lift truck that is battery powered and wherein a square wave generator is energized from the battery and controls a device such as a transistor which directly controls the current flow through the propelling electric motor of the vehicle.

A further object of this invention is to provide a motor control system for a series motor wherein a plurality of parallel connected transistors controls the current flow through the field and armature of the series motor and wherein the conductivity of the transistors is varied between on and off conditions by a square wave generating means.

Still another object of this invention is to provide a motor control system wherein the current flow through a motor is controlled by a plurality of parallel connected transistors and wherein these transistors have their conductivity controlled by a system that includes a transistor multivibrator and one or more power amplifying stages, the multivibrator and power amplifying stages being supplied with low voltage and high control current from a D.C. to D.C. converter which is powered from a battery or other direct current source.

A further object of this invention is to provide a motor control system having transistors for controlling current flow through one field winding of a motor and having a circuit for bypassing the transistors and energizing another field winding of the motor when high speed conditions are required.

Further objects and advantages of the present invention will be apparent from the following description, reference being had to the accompanying drawings wherein preferred embodiments of the present invention are clearly shown.

Figure 1:
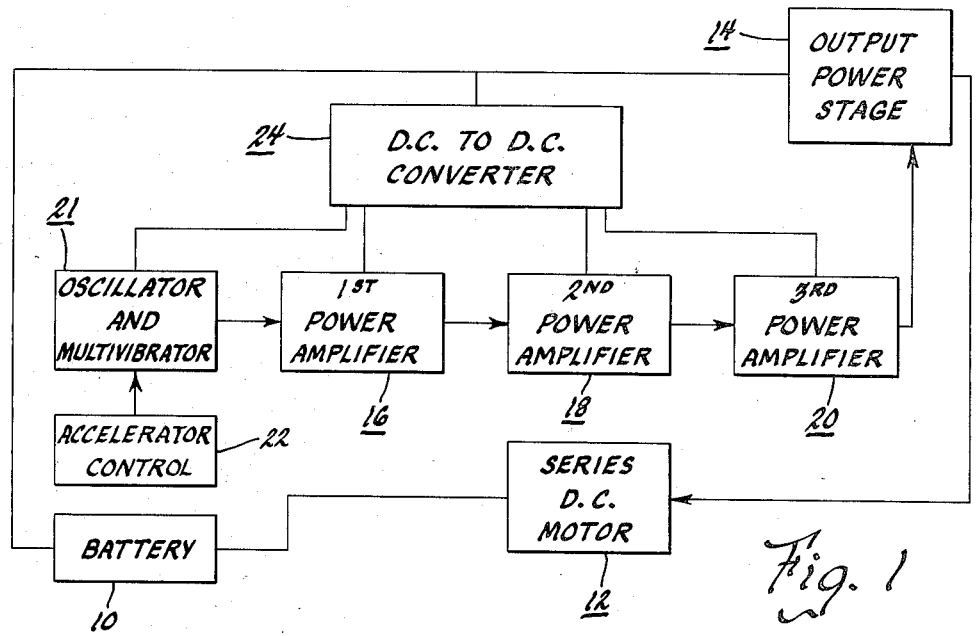
FIGURE 1 is a block diagram illustration of a motor control system made in accordance with this invention.

Referring now to the drawings and more particularly to FIGURE 1, the reference numeral 10 designates a storage battery for powering the motor control system of this invention. The battery 10 supplies electric current to a series D.C. motor 12. In a motor vehicle installation, the series motor 12 is suitably connected with the wheels of the vehicle and the system of this invention may be used to power a lift truck of the type that is commonly used for material handling in plants and factories.

The amount of current supplied to the series D.C. motor 12 is controlled by an output power stage 14 which switches the current on and off to provide an average value of current for the motor. The motor acts as an integrating device and performs as if it were operating on the average voltage supplied to it. As will be described more fully hereinafter, the motor 12 is supplied with pulses of square wave voltage the width of which may be substantially infinitely varied in order to provide a very fine and accurate speed control for the motor.

The output power stage 14 is controlled by power amplifiers 16, 18 and 20, the amplifier 16 being connected with an oscillator-multivibrator 21 which has a variable width square wave output. It can be seen from an inspection of FIGURE 2, that the power amplifier stages are made up of transistors as is the power output stage 14. The oscillator-multivibrator 21 is controlled by an accelerator control 22 which when shifted will vary the width of the square wave output pulses of the oscillator-multivibrator. The oscillator-multivibrator and the power amplifiers are all supplied with direct current from a D.C. to D.C. converter 24 which is energized from the storage battery 10.

Figure 2:
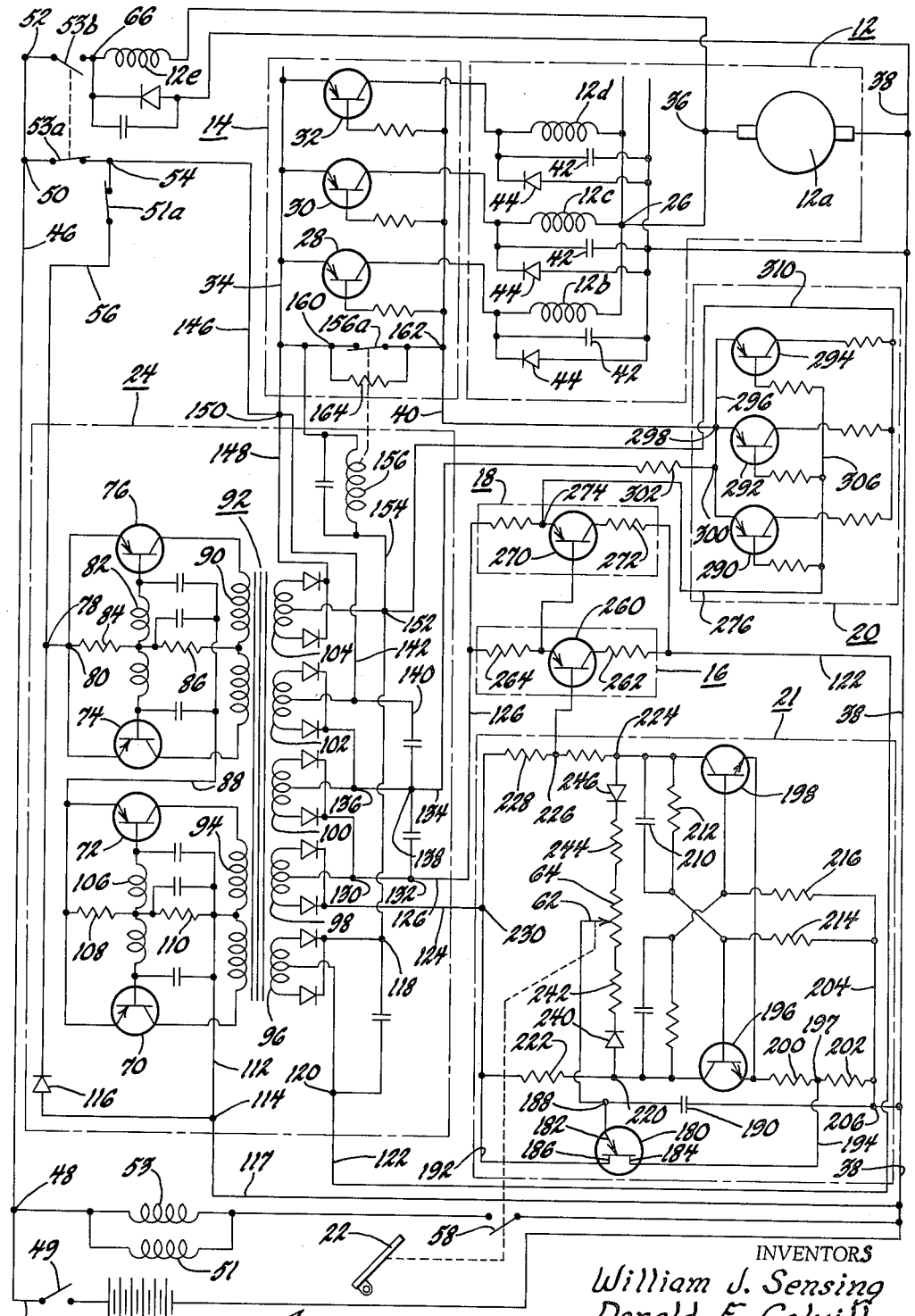
FIGURE 2 is a schematic electric circuit diagram of a motor control system made in accordance with this invention.

Referring now more particularly to FIGURE 2, a schematic electric circuit diagram is shown wherein the parts or circuit elements of the block diagram of FIGURE 1 are illustrated. In FIGURE 2, the reference numeral 10 once more designates the storage battery for powering the system whereas the reference numeral 12a designates the armature of the series D.C. motor 12. The series D.C. motor 12 also includes a plurality of field windings 12b, 12c and 12d all of which are connected together at 26 have been illustrated but in relatively high power applications as many as 27 field windings may be used. It is noted that all of these field windings give the same net effect as a single series field winding and the purpose of splitting up the single field winding into the several small field windings is to insure that the translators 28, 30 and 32 will equally share the field current. It is seen that the transistors 28, 30 and 32 are PNP type transistors and form the output power stage 14 of the electrical system. The transistors 28, 30 and 32 are three terminal semiconductor switch means. The emitters of the transistors 28, 30 and 32 are all connected with lead wire 34 whereas the collector electrodes of these transistors are connected respectively with the field windings 12b, 12c and 12d. It is also seen that the junction 26 is connected with junction 36 which in turn is connected to one side of the motor armature 12a. The opposite side of the motor armature 12a is connected with lead wire 38 which is connected to the negative side of the battery 10.

The base electrodes of transistors 28, 30 and 32 are all connected with a lead wire 40 through individual resistors as shown. Each field winding 12b, 12c and 12d and the armature 12a are bypassed by voltage transient surpressing capacitors 42 and diodes 44. It will be appreciated that there will be as many transistors 28, 30 and 32 as there are field windings 12b, 12c and 12d and that the amount of current flowing through these field windings and through the armature 12a is dependent upon the conduction of the transistors 28, 30 and 32. These transistors are connected in parallel to handle the motor load current which may become as high as 800 amperes where 27 individual field windings are used connected with 27 parallel connected transistors.

The positive side of the storage battery 10 is connected with a lead wire 46 through a switch 49. Lead wire 46 is connected with junctions 48, 50 and 52. Connected between junction 48 and lead wire 38 are a pair of relay coils 51 and 53. The relay coil 51 controls the operation of a contactor 51a which is connected between junction 54 and lead wire 56. The contactor 51a is a normally closed contactor and will open only when the relay coil 51 is energized. The relay coil 53 controls a normally closed contactor 53a and a normally open contactor 53b. When relay coil 53 is not energized, the contactors 53a and 53b are in their positions illustrated in the drawing but when the relay coil 53 is energized, the contactor 53a shifts to an open position and the contactor 53b shifts to a closed position.

The circuit for relay coils 51 and 53 is controlled by a switch 58 which is operated by an accelerator pedal 22 on the vehicle which uses the motor control system of this invention. The accelerator pedal 22 in addition to controlling switch 58 operates a shiftable tap 62 on a potentiometer resistor 64. The switch 58 is closed when the accelerator pedal is fully depressed to provide full speed operation of the motor.

It is seen from FIGURE 2 that the relay controlled switch 53b is located between junctions 52 and 66. Another field winding 12e for the motor 12 is connected between junctions 66 and 36. The field winding 12e may, for example, have the same magnetic effect as the plurality of field windings 12b, 12c and 12d and this field winding 12e is energized directly from the battery when switch 58 is closed to provide full speed for the motor 12. When the field winding 12e is energized, the other parts of the system are deenergized and are shorted out since contactor 51a will open to disconnect lead wire 56 from junction 54 and contactor 53a will likewise open to disconnect junction 50 from junction 54. The opening of switch 51a will thus disconnect the power output stage 14, the power amplifier stages, the oscillator-multivibrator 21 and the D.C. to D.C. converter 24 from the battery and the motor will be energized directly from the battery through switch 53b, the field winding 12e and the armature 12a.

The D.C. to D.C. converter 24 includes PNP transistors 70, 72, 74 and 76 each of which has emitter, base and collector electrodes. Input power to the D.C. to D.C. converter is through lead wire 56 and junction 78. The junction 78 is connected with junction 80 and it is seen that the emitter electrodes of transistors 74 and 76 are connected with junction 80. The base electrodes of transistors 74 and 76 are connected by a transformer winding 82 which has tap connections with resistors 84 and 86. The base electrodes of transistors 74 and 76 are connected through capacitors with lead wire 88 and this wire is connected to the emitters of transistors 70 and 72. The collector electrodes of transistors 74 and 76 are connected together by a primary winding 90 of the transformer 92. The transformer 92 has another input winding 94 and a plurality of secondary or output windings 96, 98, 100, 102 and 104. The winding 94 connects the collector electrodes of transistors 70 and 72 and it is seen that a transformer winding 106 connects the base electrodes of transistors 70 and 72. The transformer winding 106 has taps connected with resistors 108 and 110 the resistor 110 being connected to lead wire 112. The lead wire 112 is connected to a tap on winding 94 and is also connected with junction 114. Junctions 114 and 78 are connected by a diode 116 and it is seen that the junction 114 is also connected with the negative side of the battery 10 via lead wire 117.

The secondary winding 96 has its opposite ends connected with diodes, the opposite side of the diodes being connected with a junction 118. The secondary winding 96 is tapped and this tap point is connected with junction 120 and a lead wire 122. A capacitor is connected between the junctions 118 and 120. In a similar fashion, the opposite ends of secondary winding 98 are connected with diodes which in turn are connected with lead wire 124. The tap point on secondary winding 98 is connected with lead wire 126 which in turn is connected with junctions 130 and 132. The junction 130 is connected with one end of a pair of diodes which are connected with opposite ends of secondary winding 100. The tap on winding 100 is connected with lead wire 134 and this lead wire connects junctions 136 and 138. A capacitor is connected between junctions 132 and 138. The secondary winding 102 is connected with a pair of diodes, the opposite sides of which are connected together and to junction 136. The tap on secondary winding 102 is connected with lead wire 140 and this lead wire is connected with lead wire 142. The lead wire 142 is connected with lead wire 146 which is a power input lead wire that is connected with lead wire 46 when contactor 53a is closed. A capacitor is connected between junction 138 and lead wire 140.

The secondary winding 104 has its opposite ends connected with diodes and the opposite sides of these diodes are connected together to a lead wire 148. The lead wire 148 is connected with junction 150 and it is seen that this junction is connected with lead wire 146 and lead wire 34. The tap on winding 104 is connected with junction 152 and this junction is connected with junction 118 via lead wire 154.

A relay coil 156 is connected in series with lead wire 154 and is paralleled by a capacitor. The relay coil 156 operates a normally closed contactor 156a which is connected between junctions 160 and 162. A resistor 164 is connected across the contacts 156a. When the relay coil 156 is energized, the contactor 156a is shifted to an open position and at all other times it is closed to short circuit the emitter and base electrodes of the transistors that make up the output power stage 14.

The oscillator-multivibrator 21 includes a unijunction transistor 180 which has an emitter electrode 182, a first base electrode 184 and a second base electrode 186. The emitter electrode 182 is connected with a junction 188 which in turn is connected with the tap or shiftable part of the potentiometer resistor 64. A capacitor 190 connects the junction 188 with the negative power line 38. The second base electrode 186 is connected with a lead wire 192 and this lead wire is connected with lead wire 124 as is clearly apparent from the drawing. The first base electrode 184 is connected with lead wire 194 which is connected with the junction 197. The multivibrator comprises NPN transistors 196 and 198 each having an emitter, a collector and a base electrode. It is seen that the emitter electrodes of transistors 196 and 198 are connected together and to one side of a resistor 200. The resistor 200 is connected with junction 197 and another resistor 202 connects the junction 197 with lead wire 204. The lead wire 204 is connected with junction 206 which in turn is connected to the negative power line 38.

The base electrode of transistor 196 is connected with the collector electrode of transistor 198 through a circuit that includes a parallel connected capacitor 210 and resistor 212. In a similar fashion, the base electrode of transistor 198 is connected to the collector electrode of transistor 196 through a parallel connected resistor and capacitor. The base electrode of transistor 196 is connected with lead wire 204 via resistor 214 and the resistor 216 connects the base electrode of transistor 198 with lead wire 204.

The collector electrode of transistor 196 is connected with junction 220 and is connected with lead wire 192 through resistor 222. The collector electrode of transistor 198 is connected with junction 224 and is also connected with a junction 226. A resistor is connected between junctions 224 and 226 and another resistor 228 is connected with junction 230 which in turn is connected with lead wire 124.

Connected between the junctions 220 and 224 in the order named are a diode 240, a resistor 242, potentiometer resistor 64, resistor 244 and diode 246.

The first power amplifier 16 includes a PNP transistor 260 having emitter, base and collector electrodes. The collector electrode of transistor 260 is connected with lead wire 122 through resistor 262. The base electrode of transistor 260 is connected with junction 226 while the emitter electrode of transistor 260 is connected with lead wire 126 through a resistor 264.

The second power amplifier 18 includes a PNP transistor 270 having emitter, collector and base electrodes. The collector electrode of transistor 270 is connected with lead wire 122 via resistor 272. The base electrode of transistor 270 is connected with the emitter electrode of transistor 260. The emitter electrode of transistor 270 is connected with a junction 274 and to lead wire 126 through a resistor. The junction 274 is connected with lead wire 276.

The third power amplifier 20 includes parallel connected PNP transistors 290, 292 and 294. It is seen that the emitter electrodes of transistors 290, 292 and 294 are all connected with lead wire 296 and that this lead wire is connected with junctions 298 and 300. The junction 300 is connected with lead wire 134 through resistor 302. The junction 298 is connected with the lead wire 40 which as is seen from the drawings is connected with the base electrodes of transistors 28, 30 and 32. The base electrodes of transistors 290, 292 and 294 are connected through resistors with the lead wire 306 and this lead wire is connected with junction 274 of the second power amplifier 18 via the lead wire 276. The collector electrodes of transistors 290, 292 and 294 are connected through resistors to the lead wire 310. The lead wire 310 is connected with junction 152 of the D.C. to D.C. converter 24.

When it is desired to run the series D.C. motor 12, the manually operable switch 49 is closed and the D.C. to D.C. converter 24 will be energized. The D.C. to D.C. converter will convert the direct current of the battery 10 to alternating current and this alternating current will be transformed by the transformer 92 and then rectified back to direct current by the diodes connected with windings 96, 98, 100, 102 and 104. The transistors of the D.C. to D.C. converter operate as oscillaters to convert the direct current of the battery to alternating current. The oscillator-multivibrator, the power amplifiers and the output power stage receive high control current from the D.C. to D.C. converter as is apparent from an inspection of FIGURE 2.

Figure 3:
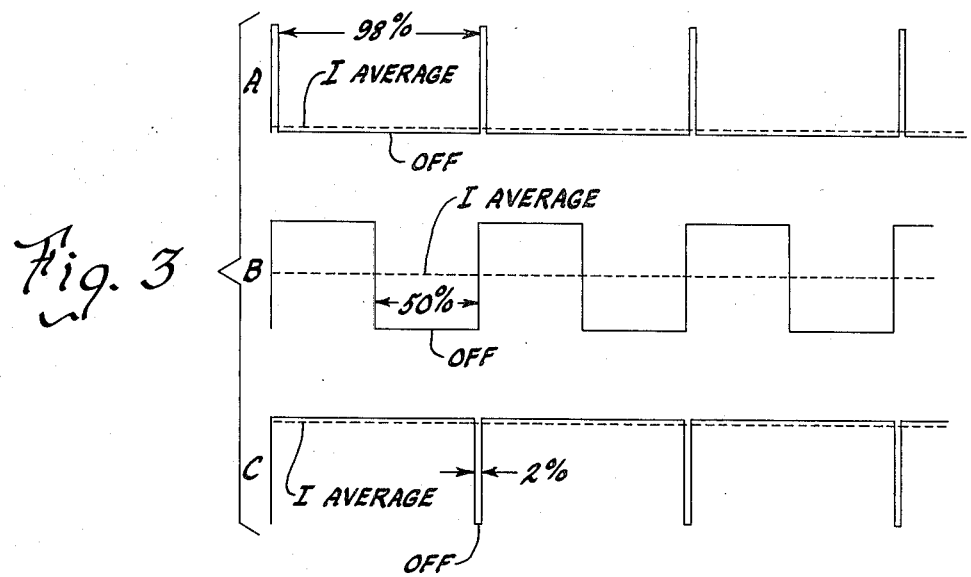
FIGURE 3 is a set of curves illustrating the output of the oscillator-multivibrator which forms a component part of the systems illustrated in FIGURES 1 and 2.

The oscillator-multivibrator 21 has an output which is depicted in the curves of FIGURE 3. This output is applied to the first power amplifier 16 and consists of square wave pulses of voltage which have a variable width. In the curve A of FIGURE 3 the square wave output pulses have a very narrow width and the multivibrator is off for approximately 98% of the time and on for 2% of the time. In curve B of FIGURE 3, the on time and off times are approximately equal or in other words, the on time is 50% of one cycle. In curve C. the on time is approximately 98% and off time is 2% so that an average current is developed with the wave forms of curve C in FIGURE 3 that is substantially equal to the peak current.

The frequency of the oscillator-multivibrator 21 is determined by the circuit constants of the system and is determined by the charging and discharging of capacitor 190 which cooperates with the unijunction transistor 180. The unijunction transistor 180 and capacitor 190 form a circuit which provides voltage pulses of a predetermined frequency. These voltage pulses control the multivibrator circuit that includes transistors 196 and 198 and the on and off time of these transistors is controlled by adjusting the voltage divider tap or potentiometer tap 62. The output from the oscillator-multivibrator thus is a square wave output, the frequency of which is determined by the oscillator portion of the circuit and the width of the square wave being determined by the multivibrator part of the circuit. This width can be varied over a wide range as is seen from FIGURE 3 so that the voltage at junction 226 can vary according to the adjustment of the potentiometer tap 62. When the potentiometer tap 62 is moved in one direction, the width of the square wave pulses increases and when it is moved in an opposite direction, this width decreases and this variation can be made over a wide range substantially between zero output and full output.

It can be seen that by varying the potential of junction 226, the emitter to base voltage of the first power amplifier transistor 260 is varied. When transistor 260 turns on between emitter and collector, it provides a current path for the base current in transistor 270 and it likewise turns on between emitter and collector. When the second power amplifying transistor 270 turns on between its emitter and collector, it provides a base current path for transistors 290, 292 and 294 of the third power amplifier. When transistors 290, 292 and 294 of the third power amplifier turn on between their emitters and collectors, a base current path is established for the transistors 28, 30 and 32 of the output power stage 14. This turns on transistors 28, 30 and 32 between their emitters and collectors and full field current is then supplied to field windings 12b, 12c and 12d through a circuit that can be traced from lead wire 46, through closed contactor 53a, through lead wire 146, through lead wire 34, through the emitter-collector circuits of transistors 28, 30 and 32, through field windings 12b, 12c and 12d, through junctions 26 and 36 and then through armature 12a to the negative power line 38. The transistors 28, 30 and 32 will be turned on for a period of time which corresponds to the width of the square wave pulses shown in FIGURE 3. Thus in the case of curve A, the transistors 28, 30 and 32 would only be turned on for 2% of a given cycle and the motor 12a would therefore operate at a relatively slow speed. As the accelerator pedal 22 is depressed, the tap 62 is shifted and the oscillator-multivibrator develops square wave output pulses of a greater width causing transistors 28, 30 and 32 to be turned on for a longer period for each cycle, for example, for a period of 50% of a cycle as shown in curve B. The motor now, of course, increases its speed because the average current supplied to the motor is now increased. With further depression of the accelerator pedal 22 and a consequent shifting of the tap 62, the square wave output pulses may cause the transistors 28, 30 and 32 to be turned on for 98% of a cycle in which case the motor would be operating at substantially full speed.

It can be seen from the foregoing that the oscillator-multivibrator 21 develops square wave output pulses which are amplified through the power amplifiers and which are applied across the emitter and base electrodes of transistors 28, 30 and 32 to control the on and off time of these transistors and therefore control the speed of the motor.

If the accelerator pedal 22 is depressed sufficiently to close the switch 58, the field current all flows through field winding 12e and the circuit is open to both the D.C. to D.C. converter 24 and to the power output stage 14. This provides for energizing the field winding 12e with total battery voltage which may be for example 36 volts.

The system of this invention employs a D.C. to D.C. converter to supply the high control current to the first, second and third power amplifiers. This converter is provided so that the amplifiers are operated with a minimum power loss and an over all high efficiency of the system. It is pointed out that the system could be operated without the D.C. to D.C. converter in which case the amplifier stages and the oscillator-multivibrator would be energized directly from the battery 10.

The relay coil 156 and contacts 156a are a safety feature which short circuits the emitter and base electrodes of the transistors of the output power stage 14 in the event that the D.C. to D.C. converter is not developing an output current.

While the embodiments of the present invention as herein disclosed, constitute a preferred form, it is to be understood that other forms might be adopted.

What is claimed is as follows:

1. A motor control system comprising, a source of direct current, a first field winding for said motor, a second field winding for said motor, a plurality of parallel connected power control transistors connected in series with said first field winding and in series with the armature of said motor, a switching means for connecting said second field winding in series with said motor armature and across said source of direct current, a multivibrator circuit having a substantially square wave output of variable width, a variable resistor for controlling the width of the output pulses of said multivibrator, means connecting said multivibrator circuit with said power control transistors whereby the conduction of said power control transistors is controlled by said square wave output of said multivibrator circuit a manually operable control means, and means coupling said manually operable control means with said variable resistor and with said switching means, said manually operable control means being operable in one position to close said switching means whereby said second field winding is connected in series with the armature of said motor and directly across the said source of direct current.

2. The motor control system according to claim 1 where the switching means includes a relay having contacts connected with said second field winding and having a coil winding in series with a switch operated by said manually operable control means.

3. A motor control system comprising, a source of direct current, a motor having first and second field windings and an armature, at least one transistor, multivibrator having a substantially square wave output voltage energized from said source of direct current, control means for varying the width of the output pulses provided by said multivibrator, means connecting the output of said multivibrator with said transistor whereby the conduction of said transistor is controlled by said square wave output voltage of said multivibrator, means connecting said transistor in series with said first field winding and in series with said armature, means connecting said second field winding in series with said armature, a switching means having first and second positions, said switching means in said first position connecting said transistor to one side of said source of direct current while disconnecting said second field winding from said source of direct current, said switching means in its second position disconnecting said transistor from said source of direct current and connecting said second field winding with said source of direct current, and a manually operable actuator controlling said control means and said switching means.

4. A motor control system comprising, a source of direct current, a motor having first and second field windings and an armature, a plurality of parallel connected transistors, a multivibrator having a substantially square wave output voltage energized from said source of direct current, control means for varying the width of the output pulses provided by said multivibrator means connecting the output of said multivibrator with said transistor whereby the conduction of said transistors is controlled by said square wave output of said multivibrator, means connecting said parallel connected transistors in series with said first field winding and in series with said armature, means connecting said second field winding in series with said armature, a switching means having first and second positions, said switching means in said first position connecting said parallel connected transistors to one side of said source of direct current while disconnecting said second field winding from said source of direct current, said switching means in its second position disconnecting said parallel connected transistors from said source of direct current and connecting said second field winding with said source of direct current, and manually operable actuator controlling said control means and said switching means, said actuator operating said control means and said switching means in a predetermined sequence.

References Cited by the Examiner
UNITED STATES PATENTS

| | | | |
|---|---|---|---|
| 2,900,606 | 8/1959 | Fankner | 331—113 |
| 2,923,873 | 2/1960 | Annis | 318—353 X |
| 2,997,665 | 8/1961 | Sylvan | 331—113 |
| 3,061,741 | 10/1962 | Eckermann et al. | 307—88.5 |
| 3,064,175 | 11/1962 | Vergez | 318—341 |
| 3,103,618 | 9/1963 | Slater. | |

ORIS L. RADER, *Primary Examiner.*

JOHN F. COUCH, *Examiner.*